Figure 1:
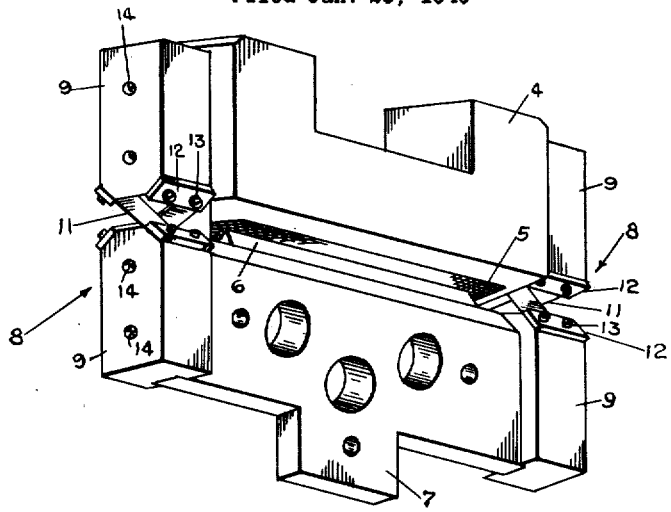

Sept. 23, 1952  H. A. HADLEY  2,611,659
PIVOT AND BEARING ASSEMBLY
Filed Jan. 28, 1949

INVENTOR.
HARLAN A. HADLEY.
BY
Henry Sherman

Patented Sept. 23, 1952

2,611,659

UNITED STATES PATENT OFFICE 2,611,659

PIVOT AND BEARING ASSEMBLY

Harlan A. Hadley, Burlington, Vt., assignor to H. A. Hadley Associates, Inc., Burlington, Vt., a corporation of Vermont Application January 28, 1949, Serial No. 73,269

12 Claims. (Cl. 308—2)

This invention relates to weighing scales, and relates more particularly to a knife edge pivot and bearing assembly adapted for use in weighing scales.

In many weighing mechanisms, levers are supported and the forces are transmitted to and from the levers by means of knife edge pivot and bearing assemblies in which the knife edge pivot rests in a suitably mounted bearing provided with a V-groove. The V-groove normally positions the pivot in a longitudinal plane and anti-friction plates applied to the end of the bearing block normally restrains the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife edge pivot, the knife edge pivot "skates" over the surface of the flattened bottom of the V-groove causing the lever to assume readily a different position for every different position of the knife edge pivot on the radius portion of the V-groove. The movement of the pivot relative to the radius portion of the V-groove alters the pivot distances, resulting in inaccuracies in the weighing.

It is an important object of this invention to provide an improved knife edge pivot and bearing assembly which will be free from the above-mentioned and other disadvantages and which will be especially simple in construction and efficient in use.

Another object of this invention is to provide a knife edge pivot and bearing assembly wherein the knife edge pivot cooperates with a flat bearing surface and wherein the pivot and the bearing are connected to each other to maintain the same in predetermined operative position relative to each other.

A further object of this invention is to provide a pair of resilient members for holding the pivot and bearing in predetermined operative relation to each other.

Still another object of this invention is the provision of a knife and bearing assembly wherein a pair of resilient members each comprising two metallic tapes for holding the pivot and bearing in operative relation to each other so that the pivot is free to turn on its normal axis but is restrained from movement in any other direction.

Other objects of this invention, together with certain details of construction and combinations of parts, will be apparent from the following description and will be pointed out in the appended claims.

Figure 2:
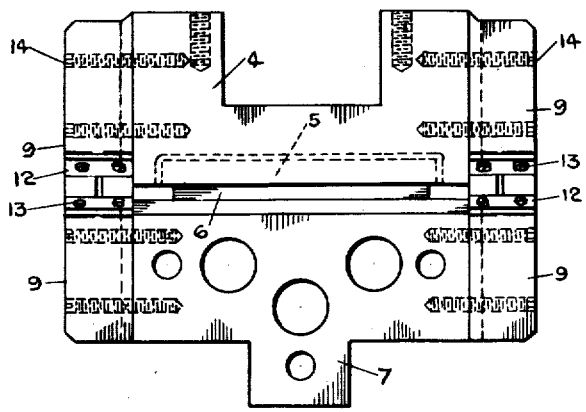
Figure 3:
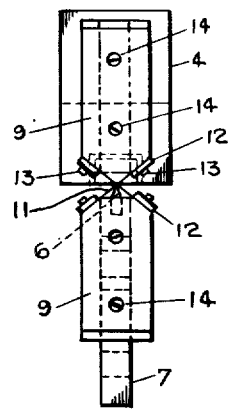

In the drawing, wherein a preferred embodiment of my invention is shown,

Figure 1 is a perspective view of my novel knife edge pivot and bearing assembly, Figure 2 is a front elevational view thereof, and Figure 3 is a side elevational view thereof.

Like reference numerals indicate like parts throughout the several views of the drawing.

Referring now to the drawing for a detailed description of my invention, the reference numeral 4 indicates a bearing block in which is imbedded a bearing 5. The bearing 5 may be made of any suitable material of sufficient hardness. Preferably, the bearing is made of Norbide, a compound of boron and carbon, ground to optical flatness.

Knife edge 6 may be integral with knife edge block 7, or may be suitably held therein, and is preferably made of Carboloy, a tungsten-carbon alloy. However, the knife edge may be made of steel or any other suitable material.

In accordance with the present invention, the knife edge 6 is maintained in proper position on the flat surface of bearing 5 by means of a flexure tape assembly generally indicated by reference numeral 8. Two of such tape assemblies are employed, one on each end of the bearing and knife edge blocks.

Each flexure tape assembly comprises two blocks 9, of any suitable material joined together by flexible tapes 11, preferably steel tapes. The tapes 11 are attached to metal blocks 9, by means of plates 12 and screws 13, in such a manner that they criss-cross, as shown in Figures 1 and 3.

In constructing the pivot and bearing assembly embodying my invention, the tape assemblies are first prepared in a suitable jig or clamp and then attached as a unit to the ends of the pivot and bearing blocks 4 and 7 by means of screws 14.

The flexure tapes are so arranged in the tape assemblies so that their opposite numbers are oppositely arranged. Thus the inside tape of one of the flexure tape assemblies will be inclined in a direction opposite to the inclination of the inside tape of the flexure tape assembly on the other end of the pivot and bearing blocks. The same is true in the case of the outside tapes. Thus, under all movements of the bearing the tapes 11 will be in tension.

Moreover, to prevent movement of the knife edge pivot relative to the bearing, the flexure tape assemblies are so arranged and attached to the pivot block and bearing block that the intersecting point of each pair of tapes is in line with the knife edge axis, or the pivotal point. Thus, when the bearing is rocked, the knife edge is caused to move about its true fulcrum point, making for greater weighing accuracy.

Usually the bearing and pivot blocks, with the pivot in proper position with respect to the bearing surface, are held in a suitable jig or clamp and the flexure tape assemblies are attached to the said bearing and pivot blocks. The pivot and bearing assembly thus obtained may be readily attached in the lever system of a weighing scale with substantially no further adjustment.

The embodiment of my invention shown and described herein is to be considered merely as illustrative, as my invention is susceptible to variation, modification and change within the spirit and scope of the appended claims.

I claim:

1. A pivot and bearing assembly comprising a block having a bearing surface, a block having a knife edge for engagement with said bearing surface, and means including cooperating pairs of flexure tapes operatively connected to said blocks for maintaining said knife edge in predetermined relation to said bearing surface.

2. A pivot and bearing assembly comprising a block having an optically flat bearing surface, a block having a knife edge for engagement with said bearing surface, and means including cooperating pairs of flexure tapes operatively connected to said blocks for maintaining said knife edge in predetermined relation to said bearing surface.

3. A pivot and bearing assembly comprising a block having a bearing surface, a block having a knife edge for engagement with said bearing surface, and two flexure tape assemblies operatively connected to said blocks, each assembly including two oppositely inclined tapes, for maintaining said knife edge in predetermined relation to said bearing surface.

4. A pivot and bearing assembly comprising a block having an optically flat bearing surface, a block having a knife edge for engagement with said bearing surface, and two flexure tape assemblies operatively connected to said blocks, each assembly including two oppositely inclined tapes, for maintaining said knife edge in predetermined relation to said bearing surface.

5. A pivot and bearing assembly comprising a block having an optically flat bearing surface, a block having a knife edge for engagement with said bearing surface, and two flexure tape assemblies operatively connected to said blocks, each assembly including two oppositely inclined tapes, for maintaining said knife edge in predetermined relation to said bearing surface, each flexure tape of one flexure tape assembly being inclined in a direction opposite to the inclination of its opposite number in the other flexure tape assembly.

6. A pivot and bearing assembly comprising a block having a bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other.

7. A pivot and bearing assembly comprising a block having an optically flat bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other.

8. A pivot and bearing assembly comprising a block having a bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other, the point of crossing of said tapes being in line with said knife edge.

9. A pivot and bearing assembly comprising a block having an optically flat bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other, the point of crossing of said tapes being in line with said knife edge.

10. A pivot and bearing assembly comprising a block having a bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other, each flexure tape of one flexure tape assembly being inclined in a direction opposite to the inclination of its opposite number in the other flexure tape assembly.

11. A pivot and bearing assembly comprising a block having an optically flat bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other, each flexure tape of one flexure tape assembly being inclined in a direction opposite to the inclination of its opposite number in the other flexure tape assembly.

12. A pivot and bearing assembly comprising a block having an optically flat bearing surface, a block having a knife edge for engagement with said bearing surface, and two flexure tape assemblies attached to said pivot and bearing blocks for maintaining said knife edge in predetermined relation to said bearing surface, each of said flexure tape assemblies including a pair of blocks having attached thereto two flexure tapes, inclined in opposite directions so as to cross each other, the point of crossing of said tapes being in line with said knife edge and each flexure tape of one flexure tape assembly being inclined in a direction opposite to the inclination of its opposite number in the other flexure tape assembly.

HARLAN A. HADLEY.

REFERENCES CITED

The following references are of record in the file of this patent:

UNITED STATES PATENTS

| Number | Name | Date |
|---|---|---|
| 392,617 | Lieb | Nov. 13, 1888 |
| 849,418 | Nickerson | Apr. 9, 1907 |
| 1,071,761 | Leake | Sept. 2, 1913 |
| 2,021,061 | Hedman | Nov. 12, 1935 |

Disclaimer and Dedication 2,611,659.—*Harlan A. Hadley*, Burlington, Vt. PIVOT AND BEARING ASSEMBLY. Patent dated Sept. 23, 1952. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]